US010688915B1

(12) United States Patent
Rastoll

(10) Patent No.: US 10,688,915 B1
(45) Date of Patent: Jun. 23, 2020

(54) VIRTUAL DRIVER DISPLAY FOR AUTONOMOUS VEHICLE

(71) Applicant: Valeo Schalter und Sensoren GmbH, Bietigheim-Bissingen (DE)

(72) Inventor: Cyril Rastoll, Palo Alto, CA (US)

(73) Assignee: VALEO SCHALTER UND SENSOREN GMBH (DE)

(*) Notice: Subject to any disclaimer, the term of this patent is extended or adjusted under 35 U.S.C. 154(b) by 0 days.

(21) Appl. No.: 16/384,755

(22) Filed: Apr. 15, 2019

(51) Int. Cl.
*B60Q 1/26* (2006.01)
*B60Q 1/00* (2006.01)
*B60Q 1/50* (2006.01)
*B60Q 1/28* (2006.01)
*B60Q 5/00* (2006.01)
*B60R 21/34* (2011.01)
*G01S 13/931* (2020.01)

(52) U.S. Cl.
CPC .......... *B60Q 1/268* (2013.01); *B60Q 1/0023* (2013.01); *B60Q 1/28* (2013.01); *B60Q 1/50* (2013.01); *B60Q 5/006* (2013.01); *B60R 21/34* (2013.01); *B60R 2021/346* (2013.01); *B60R 2300/105* (2013.01); *B60R 2300/50* (2013.01); *B60W 2420/403* (2013.01); *G01S 2013/93271* (2020.01)

(58) Field of Classification Search
CPC ........ B60Q 1/268; B60Q 1/0023; B60Q 1/28; B60Q 1/30; B60Q 1/50; B60Q 5/006; B60R 21/34; G01S 13/867; G01S 2013/93271; G02B 2027/0138

USPC .... 340/435, 436, 461, 463, 468, 485; 345/7; 348/143; 701/301
See application file for complete search history.

(56) References Cited

U.S. PATENT DOCUMENTS

| | | | | |
|---|---|---|---|---|
| 7,526,103 | B2* | 4/2009 | Schofield | G08G 1/166 382/104 |
| 8,547,298 | B2* | 10/2013 | Szczerba | G01S 13/867 345/7 |
| 9,057,874 | B2 | 6/2015 | Seder et al. | |
| 9,855,826 | B2* | 1/2018 | Sorokin | B60Q 1/50 |
| 10,107,630 | B2* | 10/2018 | Hatav | G01C 21/26 |
| 10,160,378 | B2 | 12/2018 | Sweeney et al. | |

(Continued)

FOREIGN PATENT DOCUMENTS

| | | |
|---|---|---|
| DE | 202013002141 | 5/2013 |
| WO | 2017036734 | 3/2017 |

Primary Examiner — Hung T Nguyen
(74) Attorney, Agent, or Firm — Kilpatrick Townsend & Stockton LLP

(57) ABSTRACT

Systems and methods for operating a vehicle are provided. In one example, an apparatus comprises a portion of a window of the vehicle having a configurable light transmittance, an image output device, and a controller configured to operate in a first mode when the vehicle is partially or fully controlled by a driver inside the vehicle and to operate in a second mode when the vehicle is not controlled by a driver inside the vehicle. In the first mode, the controller can adjust a light transmittance of the portion of the window to a first value to enable the driver inside the vehicle to see through the window. In the second mode, the controller can adjust the light transmittance of the portion of the window to a second value lower than the first value, and control the image output device to display an image on the portion of the window.

20 Claims, 13 Drawing Sheets

(56) References Cited

U.S. PATENT DOCUMENTS

| | | | |
|---|---|---|---|
| 2010/0292886 A1* | 11/2010 | Szczerba | G01S 13/723 701/31.4 |
| 2012/0173067 A1 | 7/2012 | Szczerba et al. | |
| 2014/0320946 A1 | 10/2014 | Tomkins et al. | |
| 2015/0220991 A1 | 8/2015 | Butts et al. | |
| 2017/0080782 A1 | 3/2017 | Spencer | |
| 2018/0072218 A1 | 3/2018 | Sweeney et al. | |

* cited by examiner

VIRTUAL DRIVER DISPLAY FOR AUTONOMOUS VEHICLE

BACKGROUND

Autonomous driving technology has experienced rapid development in recent years. An autonomous vehicle may be able to operate without the control by a driver inside the vehicle. An autonomous vehicle may be configured to operate in different modes, such as an autonomous mode or in a manual mode. In an autonomous mode, the autonomous vehicle may be controlled by, for example, an automated control system, a remote driver and/or system, etc. In a manual mode, the autonomous vehicle may be controlled by a person inside the vehicle. The person may still sit on the driver seat when autonomous vehicle operates in the autonomous mode, but the person does not need to control the autonomous vehicle and does not need to focus on the road.

One commonly encountered situation that poses a difficult challenge to autonomous driving is lack of communication between an autonomous vehicle and other users of the road (e.g., other vehicles, pedestrians, etc.). A road user typically relies on the driver of an approaching vehicle to provide certain signals (e.g., a gesture, eye movement, other types of body language, verbal communication, etc.) to predict what the approaching vehicle will do. The road user can then take certain actions (e.g., cross the street or drive through an intersection in front of the approaching vehicle) based on the prediction. However, in a case where an autonomous vehicle operates in the autonomous mode, there may be either no human driver in the vehicle to provide the signal, or a person sitting on the driver seat who is not paying attention to the road and cannot provide the signal.

Therefore, to improve safety and to facilitate the safe usage of the road by other road users, there is a need to enable an autonomous vehicle to signal a future action of the vehicle to other road users in an effective and intuitive way.

SUMMARY

The present disclosure provides an apparatus that can be part of a vehicle. In one example, the apparatus includes a portion of a window of the vehicle having a configurable light transmittance, an image output device, and a controller configured to operate in a first mode when the vehicle is partially or fully controlled by a driver inside the vehicle and to operate in a second mode when the vehicle is not controlled by a driver inside the vehicle. In the first mode, the controller is configured to adjust a light transmittance of the portion of the window to a first value to enable the driver inside the vehicle to see through the window. In the second mode, the controller is configured to: adjust the light transmittance of the portion of the window to a second value lower than the first value, and control the image output device to display an image on the portion of the window while the transmittance of the portion of the window is at the second value, wherein the image is visible from outside the vehicle.

In some aspects, content of the image includes an object that resembles a driver.

In some aspects, the apparatus further comprises one or more sensors. The controller is configured to determine the content of the image based on data collected from the one or more sensors.

In some aspects, the controller is further configured to: determine, based on data from the one or more sensors, whether a pedestrian is on a curbside in front of a crosswalk within a predetermined distance from the vehicle; and determine the content of the image based on whether the pedestrian is on the curbside in front of the crosswalk.

In some aspects, the controller is configured to, based on determining that a pedestrian is on the curbside in front of the crosswalk, include a driver making a gesture in the content of the image to indicate to the pedestrian to use the crosswalk.

In some aspects, the apparatus further comprises an audio output device and an audio input device. The controller is configured to control the image output device, the audio output device and the audio input device to provide a two-way communication session between a remote person associated with the vehicle and a person outside of the vehicle.

In some aspects, the one or more sensors further comprise a light intensity sensor configured to detect an ambient light intensity. The controller is configured to decrease the light transmittance of the portion of the window based on the ambient light intensity exceeding a threshold.

In some aspects, the portion of the window of the vehicle also has a configurable light reflectivity controllable by the controller. The controller is configured to, in a third mode of operation: control the image output device to display the image based on an input from an occupant of the vehicle; set the light reflectivity of the portion of the window to reflect light of the displayed image towards the occupant inside the vehicle; and set the light transmittance of the portion of the window to substantially block the light of the image.

In some aspects, the image is displayed on the portion of the window by an image projection device.

The present disclosure further provides a method of operating a vehicle. In one example, the method comprises: in a first mode when the vehicle is partially or fully controlled by a driver inside the vehicle, adjusting a light transmittance of a portion of a window of the vehicle to a first value to enable the driver inside the vehicle to see through the window; and in a second mode when the vehicle is not controlled by a driver inside the vehicle: adjusting the light transmittance of the portion of the window to a second value lower than the first value, and controlling an image output device to display an image on the portion of the window while the transmittance of the portion of the window is at the second value such that the image becomes visible from outside the vehicle.

In one aspect, content of the image includes an object that resembles a driver.

In one aspect, the method further comprises: collecting data from one or more sensors; and determining the content of the image based on the data collected from the one or more sensors.

In one aspects, the method further comprises: determining, based on the data from the one or more sensors, whether a pedestrian is on a curbside in front of a crosswalk within a predetermined distance from the vehicle; and determining the content of the image based on whether the pedestrian is on the curbside in front of the crosswalk.

In one aspect, the method further comprises: based on determining that a pedestrian is on the curbside in front of the crosswalk, including a driver making a gesture in the content of the image to indicate to the pedestrian to use the crosswalk.

In one aspect, the data collected from the one or more sensors include a measurement of an ambient light intensity. The method further comprises decreasing the light transmittance of the portion of the window based on the ambient light intensity exceeding a threshold.

In one aspect, the method further comprises, in a third mode of operation: controlling the image output device to display the image based on an input from an occupant of the vehicle; setting a light reflectivity of the portion of the window to reflect light of the displayed image towards the occupant inside the vehicle; and setting the light transmittance of the portion of the window to substantially block the light of the image.

The present disclosure further provides a non-transitory computer readable medium storing instructions that, when executed by a processor of a vehicle, cause the processor to perform: in a first mode when the vehicle is partially or fully controlled by a driver inside the vehicle, adjusting a light transmittance of a portion of a window of the vehicle to a first value to enable the driver inside the vehicle to see through the window; and in a second mode when the vehicle is not controlled by a driver inside the vehicle: adjusting the light transmittance of the portion of the window to a second value lower than the first value, and controlling an image output device to display an image on the portion of the window while the transmittance of the portion of the window is at the second value such that the image becomes visible from outside the vehicle.

In one aspect, content of the image includes an object that resembles a driver.

In one aspect, the instructions, when executed by the processor of a vehicle, cause the processor to perform: determining, based on data from one or more sensors, whether a pedestrian is on a curbside in front of a crosswalk within a predetermined distance from the vehicle; and determining the content of the image based on whether the pedestrian is on the curbside in front of the crosswalk.

In one aspect, the instructions, when executed by the processor of the vehicle, cause the processor to perform, in a third mode of operation: controlling the image output device to display the image on the portion of the window based on an input from an occupant of the vehicle; setting the light reflectivity of the portion of the window to reflect light of the displayed image towards the occupant inside the vehicle; and setting the light transmittance of the portion of the window to substantially block the light of the image.

BRIEF DESCRIPTION OF THE DRAWINGS

Various embodiments in accordance with the present disclosure will be described with reference to the drawings, in which.

DETAILED DESCRIPTION OF THE INVENTION

Figure 1:
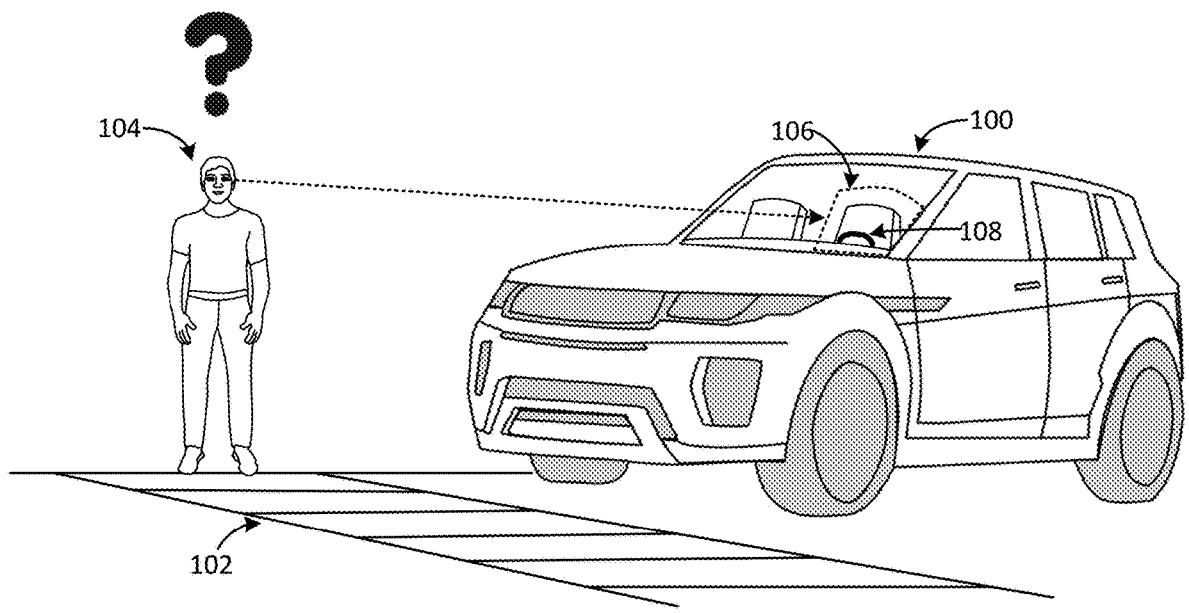
FIG. 1 illustrates an environment in which certain aspects of the present disclosure can be used.

The present disclosure relates to techniques for signaling a future action of an autonomous vehicle to other road users. The techniques can be implemented in a vehicle with a window and an image output device capable of outputting an image through at least a portion of the window. The window may include, for example, a windshield, a side window, a rear window, etc. The at least a portion of the window may have configurable light transmittance. When the vehicle operates in a non-autonomous mode (e.g., being controlled by a driver inside the vehicle), the light transmittance of the portion of the window can be set to a first value to enable the driver inside the vehicle to see through the window. When the vehicle operates in an autonomous mode (e.g., being controlled by an automated control system, by a remote driver and/or system, etc.), the light transmittance of the portion of the window can be set to a second value lower than the first value, and the image output device can be controlled to output an image using the portion of the window while the transmittance of the portion of the window is at the second value, such that the image becomes visible from outside the vehicle.

In some examples, the portion of the window may be in front of a driver seat (e.g., in a case where the window is the front windshield), and the image can include a virtual driver object resembling a driver (e.g., a realistic depiction of a human being, a cartoon figure, etc.) providing a gesture to signal a future action of the vehicle. The gesture included in the image can be determined based on, for example, a location of the vehicle, whether a foreign object (e.g., a pedestrian, another vehicle, etc.) is detected at a pre-determined distance from the vehicle, etc.

With the disclosed techniques, an autonomous vehicle can be configured to use the virtual driver to signal the vehicle's future action (e.g., to stop or to keep moving) to the other road user in a way similar to what a human driver would have done. Such arrangements can recreate a human interaction between the road user and the autonomous vehicle, and can ensure that the signaling can be readily understood by the road user without causing confusion. This not only improves safety, but also facilitates the usage of the road by other road users by providing them with information to predict the future action of the vehicle. Moreover, by providing a window with configurable light transmittance, the autonomous vehicle can also support a manual mode where a driver within the vehicle controls the vehicle and needs to have a clear view through the window. By allowing the autonomous vehicle to alternate between an autonomous mode and a manual mode, the operational flexibility of the vehicle can be improved as well.

The embodiments described in the present disclosure may be used in vehicles that offer various degrees of automated driving capabilities, ranging from partial driver assistance to full automation of the driving task. The National Highway Traffic Safety Administration (NHTSA) and the Society of Automotive Engineers (SAE) International define levels of vehicle autonomy as follows: Level 0, where the driver is in full control of the vehicle; Level 1, where a driver assistance system controls steering or acceleration/deceleration; Level 2, where the driver assistance system controls steering and acceleration/deceleration, and where the driver performs all other aspects of the driving task; Level 3, where all aspects of driving are performed by the driver assistance system, but where the driver may have to intervene if special circumstances occur that the automated vehicle is unable to safely handle such a situation; Level 4, where all aspects of driving are performed by the driver assistance system, even in situations where the driver does not appropriately respond when requested to intervene; and Level 5, where the vehicle drives fully autonomously in all driving situations, with or without a passenger. It should be noted that the term "autonomous vehicle" is sometimes used in the art to refer to any level of automation. However, in this document, "automated vehicle" is used to refer to level 1 through level 3 of automation when the vehicle is being driven in an automated mode, and the term "autonomous vehicle" is used to refer to levels 4 and 5 of the automation with little or no intervention of a human driver.

FIG. 1 shows an example of an environment in which the disclosed techniques may be used. In the example of FIG. 1, a vehicle 100 is approaching crosswalk 102, while a pedestrian 104 is waiting to cross the street over crosswalk 102. Pedestrian 104 may see vehicle 100 approaching crosswalk 102, and may look at windshield portion 106 (which is in front of driver seat 108) to look for any signaling from the driver, such as a signal to pedestrian 104 to cross the street. In the example of FIG. 1, vehicle 100 may operate in an autonomous mode (e.g., SAE levels 4-5) and may not have a human sitting on the driver seat of the vehicle. Pedestrian 104 may not receive the signal he or she expects to receive in this situation (e.g., a waving gesture from a driver to signal that pedestrian 104 can cross the street), and pedestrian 104 may not be able to predict whether vehicle 100 is going to stop in front of crosswalk 102. As a result, pedestrian 104 may decide to stay on the curbside not knowing that vehicle 100 will stop in front of crosswalk 102. The lack of communication can add delay to the decision of pedestrian 104 to cross the street and can create inconvenience for pedestrian 104. The lack of communication between pedestrian 104 and vehicle 100 also creates uncertainty. For example, pedestrian 104 may also take a risk and use crosswalk 102 while vehicle 100 is still moving towards him or her, thinking that vehicle 100 is going to stop. Meanwhile, vehicle 100 may fail to detect pedestrian 104 and is controlled to move across crosswalk 102 without stopping. Such uncertainly not only can have serious consequence for road safety but also can add psychological stress to pedestrian 104 and other road users alike.

Figure 2A:
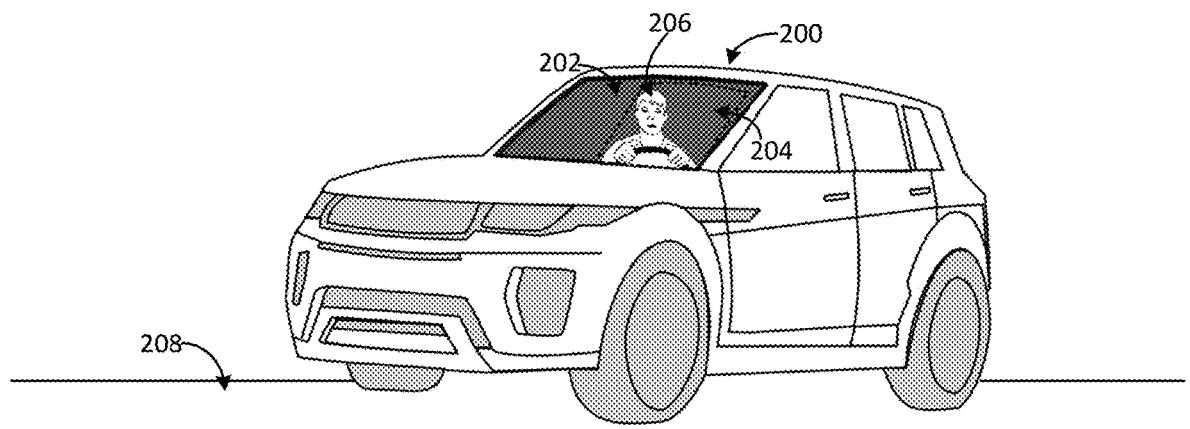
FIGS. 2A and 2B illustrate certain aspects of the present disclosure.
Figure 2B:
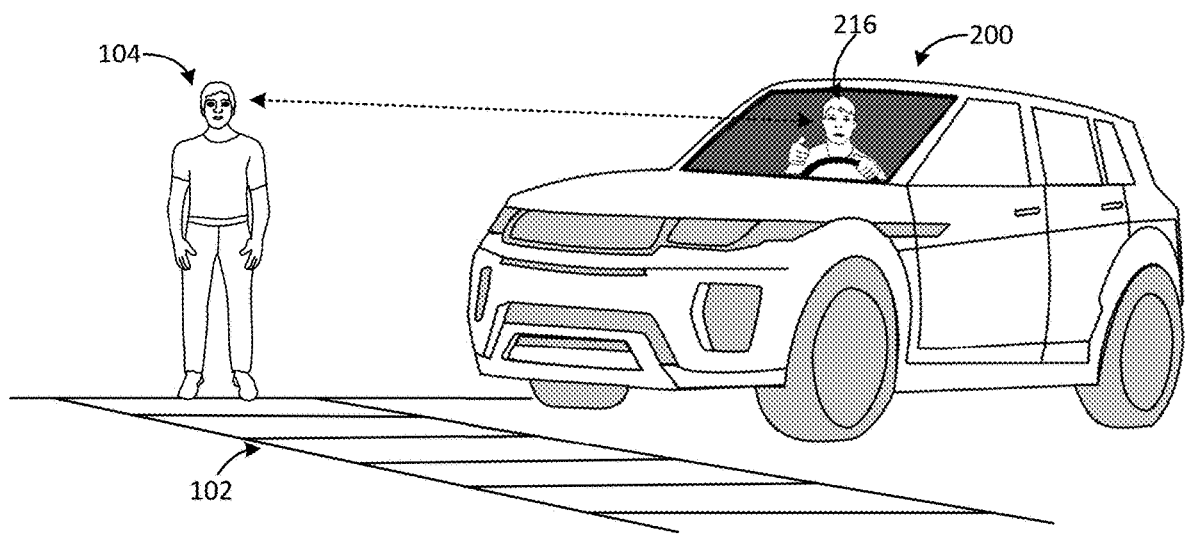

FIGS. 2A and 2B illustrate examples of techniques that can be used to provide signaling of a vehicle's future action to other road users. In the example of FIG. 2A, a vehicle 200 may include a windshield 202 with a windshield portion 204. Windshield portion 204 may be in front of a driver seat (e.g., in front of a steering wheel) of vehicle 200, or in a location of the windshield of vehicle 200 where another road user (e.g., pedestrian 104) expects to see a driver. It should be noted that although in this figure, a portion of the windshield is used for displaying the image, the image can be displayed on any of the windows of the vehicle (e.g., side window on the driver side or passenger side, windshield, rear windows, etc.), without departing from teachings of the present disclosure. An image output device (not shown in FIGS. 2A and 2B) may output an image 206 through windshield portion 204 so that image 206 is externally visible to other road users (e.g., pedestrian 104). In some examples, image 206 may include a virtual driver object that resembles a driver (e.g., a realistic depiction of a human being, a cartoon figure, etc.) and can be used to convey information about a future action of vehicle 200.

Image 206 can be adapted based on an environment and/or various driving conditions in which vehicle 200 is situated. For example, in FIG. 2A, vehicle 200 may be operating on a road 208 unobstructed, and image 206 may be adapted to depict a driver driving vehicle 200. Image 206 can be seen at windshield portion 204 by other drivers and can be used to convey, for example, that vehicle 200 will continue moving at its current speed and is not stopping imminently. In another example shown in FIG. 2B, vehicle 200 may approach crosswalk 102, while pedestrian 104 is waiting to cross the street over crosswalk 102. In this situation, an image 216 may be generated (e.g., based on image 206) to depict the driver providing a hand waving gesture, which can be seen by pedestrian 104. Based on the hand waving gesture, pedestrian 104 may understand that vehicle 200 will stop in front of crosswalk 102 to yield to pedestrian 104. Pedestrian 104 may then cross the street using crosswalk 102 (while vehicle 200 is still moving towards crosswalk 102) to expedite his/her movement.

Figure 3A:
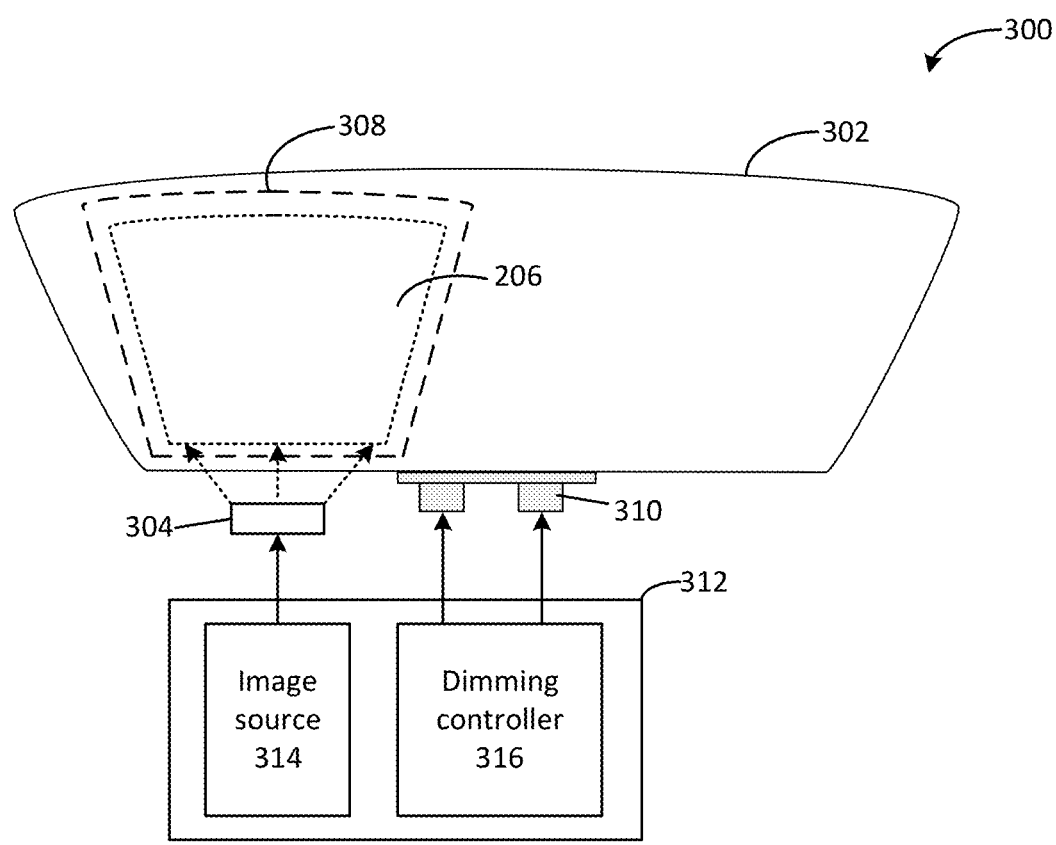
FIGS. 3A and 3B illustrate an example of a display apparatus according to certain aspects of the present disclosure.
Figure 3B:
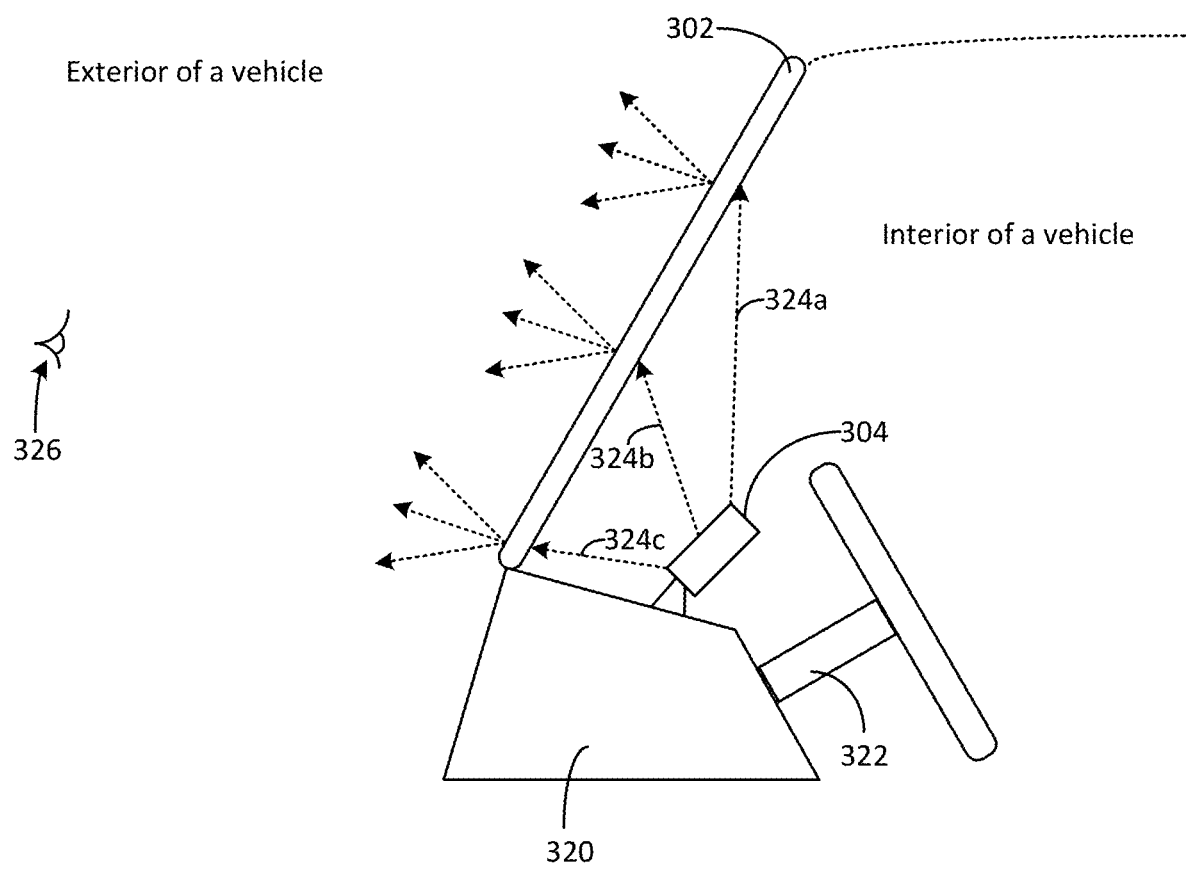

FIG. 3A and FIG. 3B illustrate components of an example display apparatus 300 that can be used to provide signaling of a vehicle's future action to other road users, according to certain embodiments. Display apparatus 300 can be part of vehicle 200 of FIG. 2A and FIG. 2B. FIG. 3A illustrates a front (or back) view of display apparatus 300. Display apparatus 300 may include a window 302 (which can be a windshield, a side window, a rear window, etc.), an image output device 304, and a controller 312. Window 302 may include a dimmable portion 308 coupled with electrodes 310, which can be used to change the light transmittance of dimmable portion 308. Image output device 304 may output image 206 through dimmable portion 308 so that image 206 can be visible to a viewer external to the vehicle. In some examples, dimmable portion 308 can extend across the entirety of window 302, whereas image 206 can be output at the location of window 302 in front of, behind, or on a side of a passenger seat (e.g., on a portion of the windshield in front of a driver seat). Display apparatus 300 further includes a controller 312 to control the operations of image output device 304 and electrodes 310. For example, controller 312 may include an image source 314 to provide data of image 206 to image output device 304. Controller 312 may also include a dimming controller 316 to control electrodes 310 to change the light transmittance of dimmable portion 308. As to be discussed below, controller 312 may receive data from one or more sensors (not shown in FIGS. 4A and 4B) and can control image source 314 to change the image data provided to image output device 304 based on the sensor data. Controller 312 may also control dimming controller 316 to change the light transmittance of dimmable portion 308 based on the sensor data.

FIG. 3B illustrates a side view of the example display apparatus 300 in a case where window 302 is part of the windshield of a vehicle. In the example shown in FIG. 3B, window 302 (e.g., dimmable portion 308) and image output device 304 may form a rear projection system. Image output device 304 may be an image projector positioned within a compartment of a vehicle. For example, image output device 304 may be positioned on a console 320 and above a steering column 322 of a vehicle. Image output device 304 can project light 324a-324c of an image (e.g., image 206) towards window 302 and dimmable portion 308. Dimmable portion 308 can allow some or all of light 324a-324c to penetrate through. Dimmable portion 308 can also provide a diffusive medium (e.g., performing similar functions as a projection film) which can diffuse light 324a-324c to enable an external viewer 326 to view the projected image from various angles and without distorting the projected image.

In some examples (not shown in FIG. 3B), window 302 (e.g., dimmable portion 308) and image output device 304 may also form a front projection system. For example, image output device 304 can be positioned external to the compartment of the vehicle (e.g., next to the windshield wipers) and can project the image light onto dimmable portion 308, which can provide diffuse reflection of the image light towards external viewer 326.

Besides forming an image projection system, image output device 304 and window 302 can also be integrated together as a single piece of display device (not shown in FIG. 3B). For example, window 302 may include a set of transparent active display devices (e.g., transparent organ light emitting diodes (OLED)) which can be connected to transparent electrodes controlled by image source 314. In this case, window 302 can be configured as a display device to generate image light, rather than passively transmitting or reflecting image light generated by another source. In general, the windshield and/or any of the windows of the vehicle (or any portion thereof) can be a display device with adjustable light transparency that can be adjusted based on the mode of operation of the vehicle.

In some examples, dimmable portion 308 may be formed by attaching a film made of electrochromic material on a surface of window 302, or integrating the film within window 302 (e.g., by sandwiching the film between two glass layers to form window 302). A variable electric field can be applied across dimmable portion 308 using electrodes 310 to change the light transmittance of the electrochromic film as well as dimmable portion 308. One example of electrochromic material that can be used in display apparatus 300 is polymer dispersed liquid crystal. For example, when electrodes 310 supply no electric field (or a relatively weak electric field), the liquid crystals in the PDLC film can be positioned randomly, which can scatter and/or reflect the incident light, and reduce a quantity of light transmitted through dimmable portion 308. The light transmittance of dimmable portion 308 can be reduced to the extent that dimmable portion 308 can become completely opaque. When dimmable portion 308 becomes completely opaque, it may also reflect light incident upon dimmable portion 308. On the other hand, when electrodes 310 supply a relatively strong electric field, some or all of the liquid crystals in the PDLC can be aligned. The number of liquid crystals that are aligned (or oriented in a pre-determined direction) can control a quantity of light passing through the PDLC film, as well as the light transmittance of dimmable portion 308. Other examples of electrochromic materials may also be used to create dimmable portion 308 such as, for example, micro-blinds, nanocrystals, etc.

In some examples, the film may also include active display devices (e.g., transparent OLED devices) which can be controlled to generate light. The active display devices may be used to generate light to block the view of a person via the windshield, which can change the perceived transparency of the windshield to achieve similar result as adjusting the light transmittance of the windshield.

In some examples, the light transmittance of dimmable portion 308 can be adjusted based on an ambient light intensity to improve the quality of the image as seen by an external viewer. One aspect of quality improvement can be in the contrast ratio, which defines the ratio of the luminance of the brightest color (white) to that of the darkest color (black) of image 206. A high contrast ratio is desirable which allows different colors across the color spectrum between the white and black colors to become more easily discernable. When image 206 is output via a completely transparent windshield, the ambient light intensity of the environment in which the image is viewed may set a limit in the contrast ratio. For example, the ambient light intensity can set a lower bound of a luminance of the black level of image 206, whereas the upper bound of a luminance of the white level of image 206 may be bounded by the output power of the image output device. If image 206 is viewed in an environment with very strong ambient light (e.g., under strong sunlight), the luminance of the black level may increase, which reduces the contrast ratio. On the other hand, by outputting image 206 via a windshield with reduced light transmittance, the luminance of the black level of image 206 may be reduced with respect to the luminance of the white level of image 206, and the contrast ratio can be increased.

To improve the contrast ratio of image 206 as seen by an external viewer, controller 312 can reduce the light transmittance of dimmable portion 308 (e.g., by reducing the electric field applied by electrodes 310) in an environment with strong ambient light (e.g., daytime with sunny weather). Controller 312 can also increase the light transmittance of dimmable portion 308 (e.g., by increasing the electric field applied by electrodes 310) in an environment with weak ambient light (e.g., nighttime and/or daytime with cloudy weather). In some examples, vehicle 200 may include optical sensors mounted on the body of the vehicle to measure the ambient light intensity, and provide the light intensity measurement data to controller 312, which can adjust the light transmittance of dimmable portion 308 based on the light intensity measurement data.

In some examples, the light transmittance of dimmable portion 308 can also be adjusted by controller 312 based on other inputs. For example, the light transmittance of dimmable portion 308 can be adjusted manually by a driver, or can be adjusted based on a sensor inside vehicle 200 (e.g., a proximity sensor, a weight sensor, a camera, a driving monitoring system etc.) detecting a person sitting on the driver seat. The adjustment may be to, for example, maximize the light transmittance of dimmable portion 308 when the vehicle is operated in a manual mode so that the driver can have a clear view of the road condition in front via window 302. In some examples, the light transmittance of dimmable portion 308 can also be adjusted based on a proximity sensor inside vehicle 200. In some examples, the light transmittance of dimmable portion 308 (as well as the entirety of window 302) may also be set to minimum when the vehicle is parked and no passenger is in the vehicle. Such arrangements can prevent people outside the vehicle, including potential thieves, from looking through window 302 of a parked vehicle, to improve security and privacy).

Figure 4A:
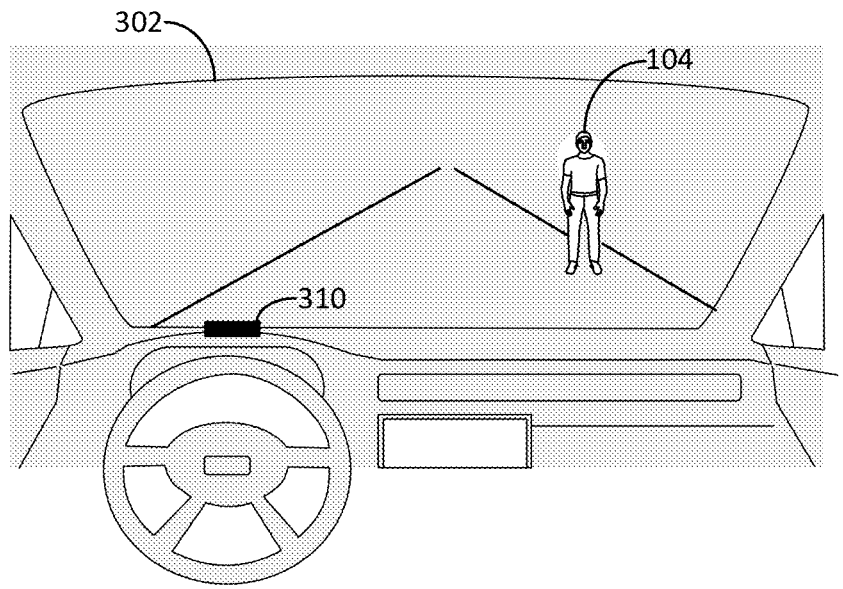
FIGS. 4A and 4B illustrate examples of operations of the display apparatus of FIGS. 3A and 3B according to certain aspects of the present disclosure.
Figure 4A:
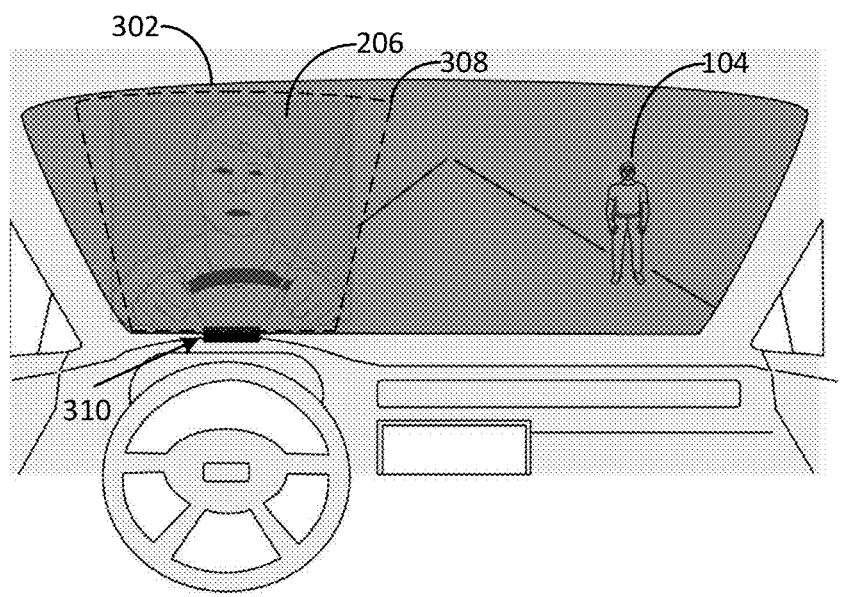
Figure 4B:
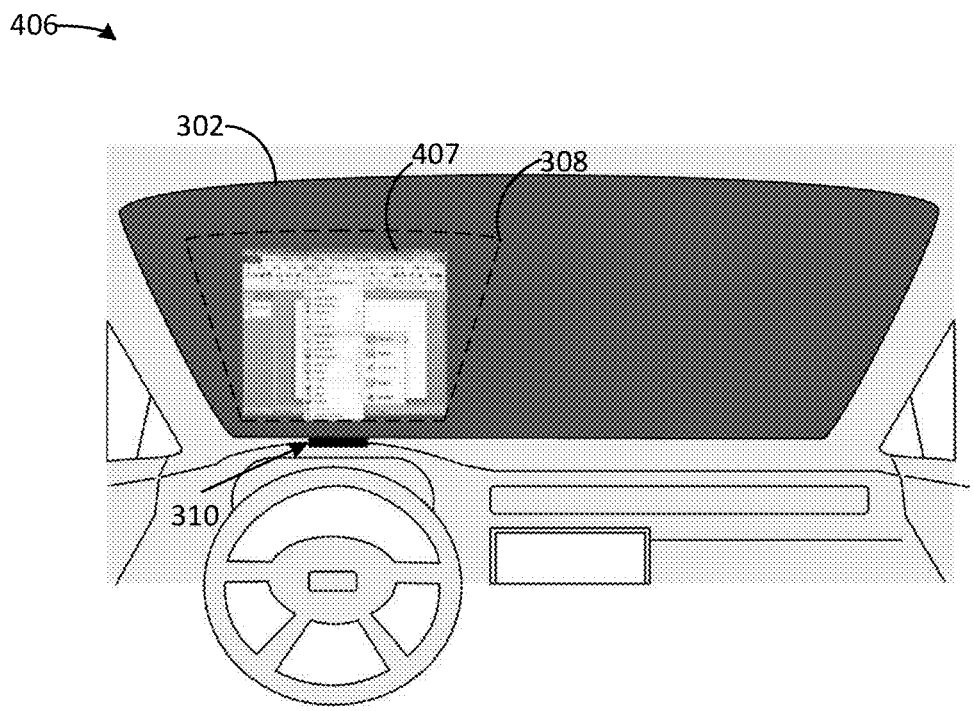
Figure 4B:
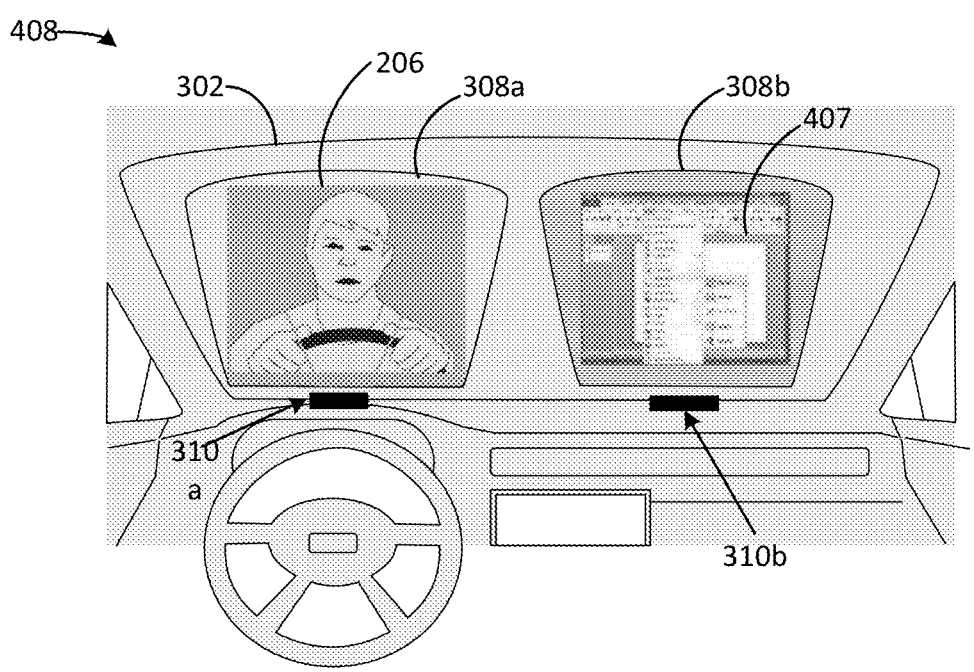

FIGS. 4A and 4B illustrate examples of operations of display apparatus 300. FIG. 4A illustrates operations 402 and 404. In operation 402, vehicle 200 can be operated in a manual mode to be controlled by a driver inside vehicle 200 (e.g., SAE levels 1 and 2). To provide the driver with a clear view of the road condition, as well as pedestrian 104, in front of vehicle 200 so that the driver can control vehicle 200 in a safe manner, window 302 (and dimmable portion 308) can be controlled to have maximum light transmittance. Moreover, image output device 304 can be disabled and and/or controlled to not project any light onto window 302, to avoid obstructing the view of the driver. In operation 402, the light transmittance of dimmable portion 308 can be adjusted by controller 312 based on, for example, a manual input from the driver (e.g., to configure the vehicle to operate in a manual mode), detection of a person sitting on the driver seat by a proximity sensor or a weight sensor, etc.

In operation 404, vehicle 200 can be operated in an autonomous mode where the vehicle is controlled by an automated control system (e.g., SAE levels 4-5) and/or controlled by a remote driver/system. With vehicle 200 in the autonomous mode, the driver (or any other passenger within vehicle 200) does not need to control the vehicle, and does not need to have a clear view of the road condition (and pedestrian 104) in front of vehicle 200. In operation 404, the light transmittance of dimmable portion 308 (or the entirety of window 302) can be reduced, and image output device 304 can be enabled to project image 206 onto window 302 such that image 206 can be externally visible to pedestrian 104. In operation 404, the light transmittance of dimmable portion 308 can be adjusted by controller 312 based on, for example, a manual input from the driver (e.g., to configure the vehicle to operate in the autonomous mode), ambient light measurement data provided by external optical sensors, etc.

FIG. 4B illustrates operations 406 and 408. In operation 406, the light transmittance of dimmable portion 308 can be further reduced with respect to operation 404. For example, dimmable portion 308 can be configured to become completely opaque. In this operation, image output device 304 can be controlled to output an image 407 to be viewed by a driver and/or other passengers within vehicle 200. Image 407 may include, for example, a video, a software application interface, etc. Due to the complete opacity of dimmable portion 308, image 407 may not be externally visible to other people outside of vehicle 200, and may be reflected towards the interior of the vehicle. In operation 406, the light transmittance of dimmable portion 308 can be adjusted by controller 312 based on, for example, a manual input from the driver and/or passengers to convert dimmable portion 308 into an internal image projection screen. This mode can be used, for example, when a passenger uses a parked vehicle as an office or when the vehicle is being driven in fully autonomous mode.

In some examples, display apparatus 300 may include two image output devices and two dimmable portions. Each image output device and each dimmable portion can form an independent display unit. One display unit can be used for displaying images to be externally visible to people outside of vehicle 200, whereas the other display unit can be used for displaying images to the driver and/or passengers inside vehicle 200. Operation 408 illustrates an example of operating two dimmable portions 308a and 308b with two image output devices 310a and 310b. Dimmable portion 308a and image output device 310a may be located on the driver side of window 302 to output image 206, whereas dimmable portion 308b and image output device 310b can be on the passenger side of window 302 to output image 407. Dimmable portion 308a can have higher light transmittance than dimmable portion 308b such that image 206 can be externally visible whereas image 407 is mostly visible internally for the passenger (or other people behind window 302). In operation 408, dimmable portion 308a and image output device 310a may be configured as a rear projection device, whereas dimmable portion 308b and image output device 310b can be configured as a front projection device. In some embodiments, the dimmable portion 308a and 308b may overlap and the images 206 and 407 may be projected on overlapping portions of the windshield (e.g., one from a projection device inside the vehicle and one from a projection device outside the vehicle).

As discussed above, the image output by image output device 310a can be updated based on data collected by one or more sensors. The data collected by the sensors can provide information about an environment in which vehicle 200 is located to the controller. As an example, the one or more sensors may include camera(s), ultrasonic sensor(s), RADAR(s), LiDAR(s), and any other types of sensors without departing from the teachings of the present disclosure. The image is output by image output device 310a to be adapted to reflect the instantaneous environment. Given that the automated control system that controls vehicle 200 is also likely to determine a future action based on the instantaneous environment, the adaptation of the image according to the instantaneous environment can enable other road users to better predict the future action of the vehicle, and safety can be improved.

Figure 5A:
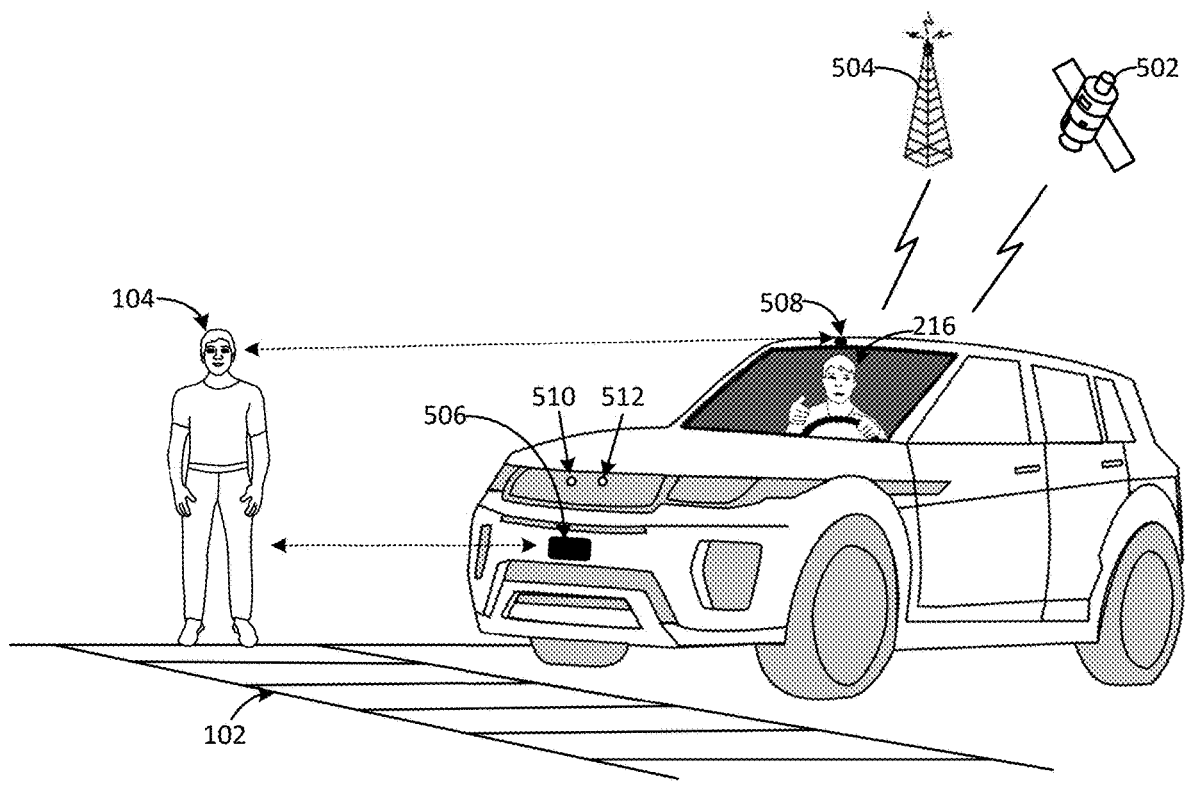
FIGS. 5A and 5B illustrate examples of applications of the display apparatus of FIGS. 3A and 3B according to certain aspects of the present disclosure.
Figure 5B:
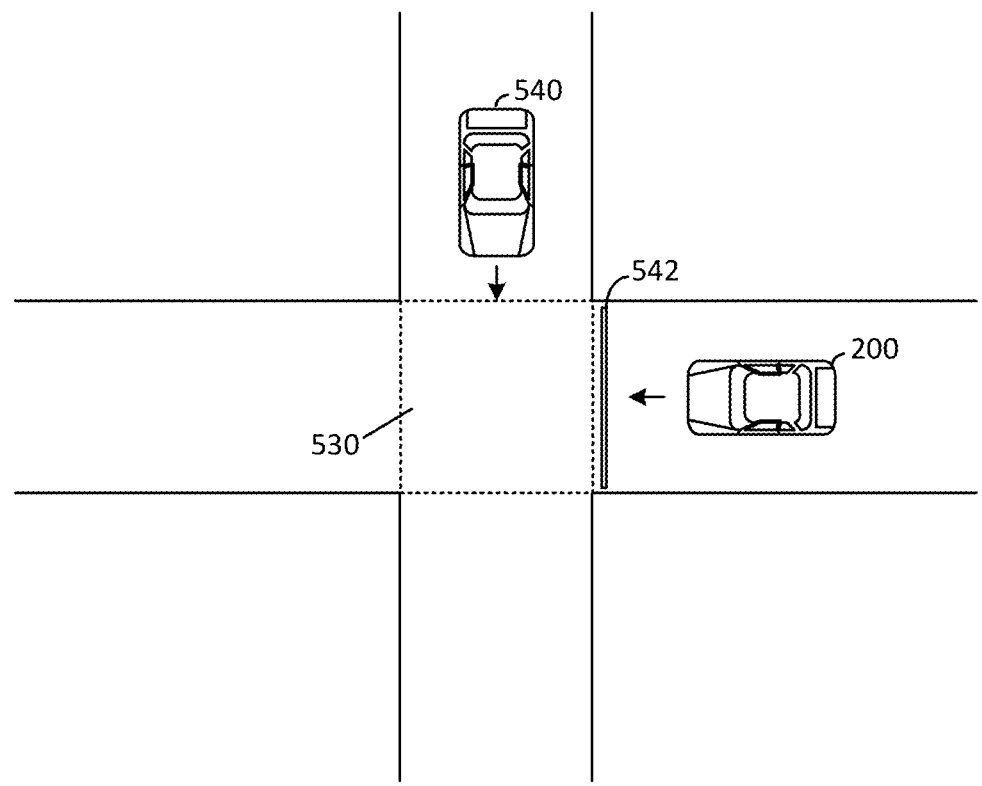

FIGS. 5A and 5B illustrate various measurements related to an environment for output image determination. The environment in FIG. 5A may be similar to the environment depicted in FIG. 1, in which vehicle 200 is approaching crosswalk 102, while pedestrian 104 is waiting to cross the street over crosswalk 102, and controller 312 may control image output device 310a to output an image that depicts a driver providing a hand waving gesture to signal pedestrian 104 to use the crosswalk.

To determine to output an image that depicts a driver providing a hand waving gesture to signal pedestrian 104 to use the crosswalk, controller 312 may determine that vehicle 200 is approaching crosswalk 102. The determination can be based on sensing a location of vehicle 200 and determining, based on the location information and a map of crosswalks, that vehicle 200 is close to crosswalk 102. The sensing of the location of vehicle 200 can be based on signals provided by satellite 502 (e.g., Global Positioning System (GPS) signals), by cell towers 504 (e.g., Positioning Reference Signal (PRS)), etc. By comparing the location of the vehicle and known locations of crosswalks from the map, controller 312 may determine a distance between vehicle 200 and crosswalk 102. In another example, the controller may process images received from one or more cameras to determine if the vehicle is approaching a crosswalk.

In addition, controller 312 may also determine that a physical object (e.g., a pedestrian) is on one end of crosswalk 102. The determination can be based on a combination of data from, for example, radar sensor 506, camera 508 and LiDAR 514. For example, radar sensor 506 can transmit radio waves and monitor for reflected radio waves, based on which radar sensor 506 (or controller 312) can detect a physical object which reflects the radio waves. Based on a timing difference between the transmitted radio waves and the reflected radio waves, controller 312 can also determine a distance between vehicle 200 and the physical object. Based on the distance as well as the locations of vehicle 200 and crosswalk 102, controller 312 may determine that an object is located on one end of crosswalk 102. Moreover, controller 312 may also use camera 508 to capture an image of the object and determine, from the image, that the object is a pedestrian. Controller 312 may perform image analysis to identify, for example, a human head from the image, an outline of a human body from the image, or other suitable image features associated with a human. Based on the image features, controller 312 may determine that a pedestrian (e.g., pedestrian 104) may be standing on one end of crosswalk 102 waiting to cross the street, and the distance between vehicle 200 and pedestrian 104.

Moreover, upon determining that the distance between vehicle 200 and pedestrian 104 drops to within a predetermined threshold distance (e.g., a typical human visual range for an image output by image output device 304), and that vehicle 200 is approaching crosswalk 102, controller 312 may then control image source 314 to provide image 216 of a driver providing a hand waving gesture to signal pedestrian 104 to cross the street over crosswalk 102.

In one example, controller 312 may also output, via a speaker 510, an audio signal to pedestrian 104, prior to (or concurrent with) providing image 216 to image output device 304 for displaying on window 302. Controller 312 may determine that the pedestrian likely does not see vehicle 200, and may output audio signal to pedestrian 104 to draw his or her attention to image 216. The determination can be based on, for example, determining a gaze direction of pedestrian 104 from the image data provided by camera 508 and comparing the gaze direction (and/or an orientation of the head) of pedestrian 104 with a direction window 302 is facing. Based on determining that pedestrian 104 is likely not looking at vehicle 200 (and likely not looking at window 302), controller 312 may output audio signal via a speaker 510 when the distance between vehicle 200 and pedestrian 104 is within the pre-determined threshold distance (or within another threshold distance based on a typical human audio range).

In one example, display apparatus 300 can also be used to provide two-way communication between pedestrian 104 (or other human beings, such as law enforcement personnel) and a remote driver controlling vehicle 200. For example, via satellite 502 and/or cell towers 504, a remote operator (e.g., a remote driver or a remote person responsible for a fleet of autonomous vehicles) can transmit his or her voice and image data, in real-time, to controller 312, which can then output the received image and voice data to, respectively, image output device 304 and speaker 510. Camera 508, as well as an external microphone 512, may capture image and voice data from pedestrian 104 (e.g., a law enforcement officer), which controller 312 can transmit back to the remote operator via satellite 502 and/or cell towers 504. In one example cameras and microphone can be located on the side of the vehicle to enable communication with pedestrian located on the side of the vehicle. The two-way communication enables exchange of information (between pedestrian 104 and the remote operator of vehicle 200, e.g., real-time information about the environment provided by pedestrian 104 who is physically in the environment, the remote driver's planned operation of the vehicle, etc.), which can improve the operation of the vehicle by the remote driver and enhance safety and user experience. In another example, the display apparatus can be used for two-way communication between law-enforcement personnel and a remote person associated with the vehicle. For example, the law-enforcement officer may perform a traffic stop on the vehicle (e.g., an autonomous vehicle) and need some information (e.g., vehicle registration, etc.) from the remote operator. The remote operator may send the requested information through the communication link to the vehicle to be displayed on the window of the vehicle to be seen by the law-enforcement personnel.

In addition to providing a signal to pedestrians, the disclosed techniques can also be used to provide a signal to a human driver at an intersection. FIG. 5B illustrates an environment in which the output image is determined based on detection of another vehicle in an intersection. In the environment of FIG. 5B, vehicle 200 may be approaching an intersection 530. To determine what image to display on window 302, controller 312 may first determine that vehicle 200 is approaching intersection 530 (e.g., based on the location of vehicle 200 provided by satellite 502 and/or cell towers 504 and a map of intersections and their known locations, or detected by RADAR, LiDAR, Cameras, etc.), and then determine whether vehicle 200 has the right-of-way when it crosses intersection 530. If controller 312 determines that vehicle 200 has the right-of-way, controller 312 may provide image 206 (e.g., a driver driving without providing a gesture) to image output device 304.

On the other hand, if controller 312 detects that another vehicle 540 is approaching intersection 530 (e.g., based on data from radar sensor 506), and that vehicle 540 has the right-of-way, controller 312 may provide image 216 (e.g., a driver providing a hand waving gesture) to image output device 304 for displaying on window 302, to signal to the other driver in vehicle 540 to cross intersection 530. Controller 312 may provide image 216 to image output device 304 when, for example, the distance between vehicle 200 and stop line 542 of intersection 530 (e.g., where vehicle 200 is supposed to stop) is within the aforementioned pre-determined threshold distance (e.g., a typical human visual range for an image output by image output device 304).

There are various ways by which controller 312 can determine that vehicle 200 (or vehicle 540) has the right-of-way. For example, controller 312 may determine that vehicle 200 is not approaching a stop sign, which indicates that vehicle 200 has the right-of-way. Controller 312 may also determine that vehicle 200 has the right-of-way based on a traffic light (e.g., green), or other traffic signs. Moreover, in the case where the traffic signs and/or traffic lights indicate that vehicle 200 may need to stop, controller 312 may also determine whether vehicle 540 will have the right-of-way when vehicle 200 reaches intersection 530. The determination can be based on, for example, the traffic signs/lights facing vehicle 540 (which can be determined from a map of traffic lights and signs), the speed of vehicle 540, etc. As an illustrative example, if both vehicles 200 and 540 are approaching a stop sign, and that vehicle 540 is likely to reach the stop sign earlier than vehicle 200 (or within a pre-determined window before or after vehicle 200 reaches the stop sign), controller 312 may determine that vehicle 540 has the right-of-way, and provide image 216 with a driver providing a hand waving gesture to image output device 304 to signal to the driver of vehicle 540 to cross intersection 530.

In some examples, controller 312 may also control image output device 304 to output the virtual driver image (e.g., a driver driving, a driver providing a gesture, etc.) only at times and locations where other road users are expected to pay attention to the virtual driver image. For example, controller 312 may control image output device 304 to output the virtual driver image only when vehicle 200 is at a location where communication with the other road user is typical (e.g., at a crosswalk, at an intersection, etc.), and can disable image output device 304 when vehicle 200 is at other locations (e.g., on a highway). Such arrangements can be adopted to, for example, reduce unnecessary distraction of other drivers and/or pedestrians, to reduce power consumption, etc.

Figure 6:
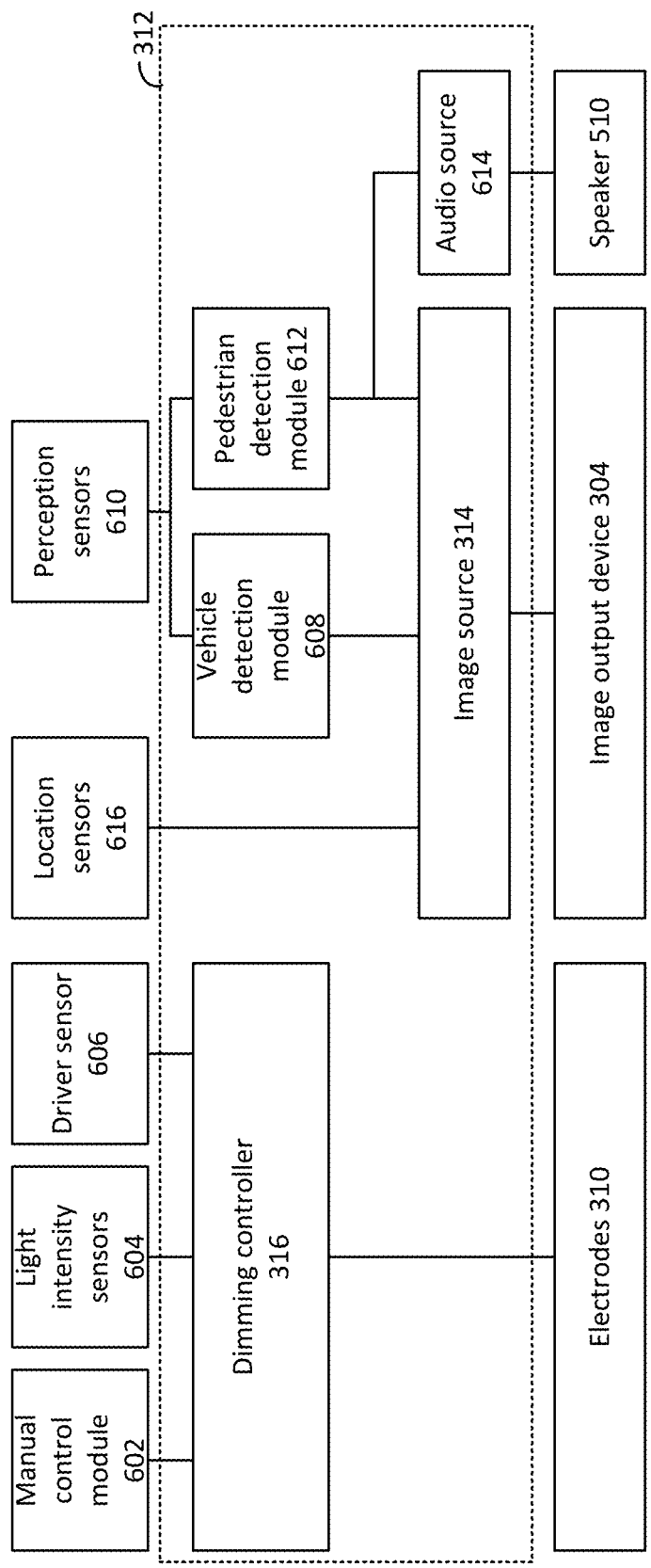
FIG. 6 illustrates an example of a display apparatus according to certain aspects of the present disclosure.

FIG. 6 illustrates additional components of controller 312 and their connections with various sensors and/or other input devices. As shown in FIG. 6, dimming controller 316 is coupled with a manual control module 602, light intensity sensors 604, and driver sensors 606. Driver sensors 606 may include, for example, a proximity sensor, a weight sensor and/or a camera to sense whether a driver sits on the driver seat. These sensors enable the light transmittance of different portions of window 302 (e.g., dimmable portions 308a and 308b) to be set either manually (from manual control module 602), based on ambient light intensity (based on light intensity data provided by light intensity sensors 604, which can be part of camera 508 of FIG. 5B), and/or based on whether a person sits on the driver seat (based on measurements provided by driver sensors 606).

Moreover, controller 312 further includes a vehicle detection module 608 to detect a vehicle and its distance from vehicle 200. Vehicle detection module 608 may perform the detection based on measurements provided by perception sensors 610, which may include, for example, radar sensors (e.g., radar sensors 506), image sensors (e.g., camera 508), LiDAR, etc. Controller 312 further includes a pedestrian detection module 612 which may perform the detection also based on measurements provided by perception sensors 610. For example, based on measurements provided by radar sensors 506, pedestrian detection module 612 may determine a distance between vehicle 200 and a pedestrian. Moreover, based on image data provided by camera 508, pedestrian detection module 612 may determine that an object in the image is a pedestrian. Pedestrian detection module 612 may also determine a gaze direction of the detected pedestrian, and control audio source 614 to output audio signals if the gaze direction indicates that the pedestrian is not looking at vehicle 200. Both vehicle detection module 608 and pedestrian detection module 612 can provide the detection results to image source 314.

In addition, image source 314 may also obtain, from location sensors 616, a location of vehicle 200. By combining the location information, map information (e.g., a map of intersections and crosswalks), as well as the detection results from vehicle detection module 608 and pedestrian detection module 612, image source 314 may identify the conditions described in FIGS. 5A and 5B and determine what image to provide to image output device 304 for displaying on window 302, whereas dimming controller 316 can adjust the light transmittance of window 302 based on ambient light intensity to improve the display quality of the image.

Figure 7A:
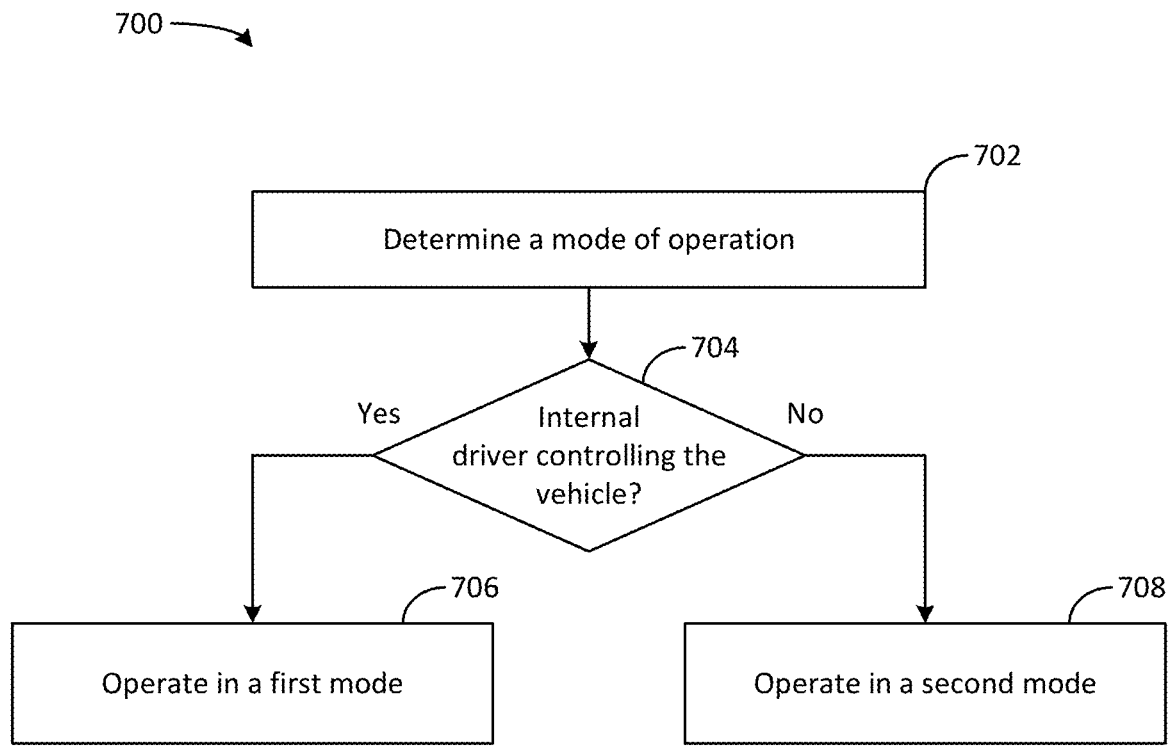
FIGS. 7A-7C illustrate a method for operating a display apparatus, according to certain aspects of the present disclosure.
Figure 7B:
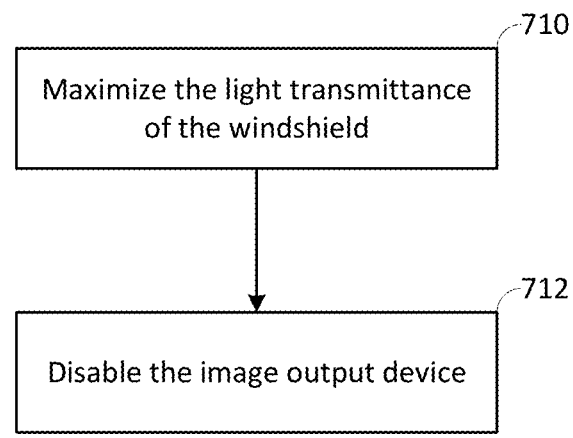
Figure 7C:
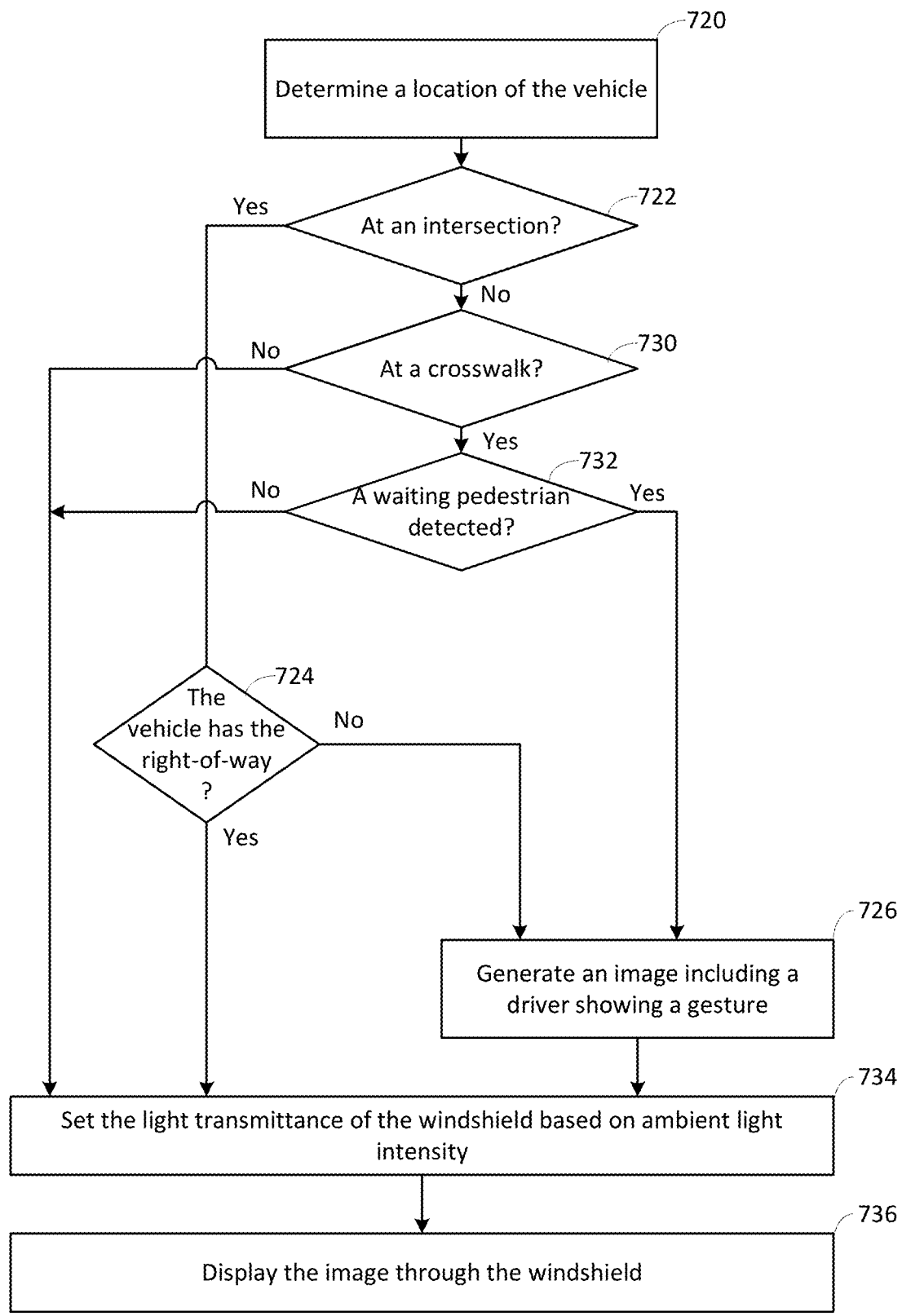

FIGS. 7A-7C illustrate a method 700 for operating a display device of a vehicle (e.g., image output device 304 and dimmable portion 308 of vehicle 200). In some examples, method 700 can be performed by, for example, controller 312 of FIG. 3A and FIG. 6.

Referring to FIG. 7A, at 702, controller 312 may determine a mode of operation of the display device. The determination can be based on, for example, whether vehicle 200 is in an autonomous mode where the vehicle is controlled by an automatic control system (e.g., SAE levels 4-5) and/or by a remote driver/system, or vehicle 200 is in an manual or automated mode (e.g., SAE levels 1-3) where a driver within the vehicle (an internal driver) is controlling the vehicle or may need to take control of the vehicle in short notice. If the vehicle is controlled by an internal driver (at 704), controller 312 may operate the display device in a first mode, at 706. If the vehicle is in the autonomous mode (at 704), controller 312 may operate the display device in a second mode, at 708.

FIG. 7B illustrates an operation of the display device in the first mode. At 710, controller 312 may maximize the light transmittance of the windshield (or set it to a first value that exceeds a reference) by, for example, configuring electrodes 310 to output a strong electric field. At 712, controller 312 may disable image output device 304, to provide the internal driver with an unobstructed view through dimmable portion 308 of window 302.

FIG. 7C illustrates an operation of the display device in the second mode. At 720, controller 312 may determine a location of vehicle 200 based on, for example, signals received by location sensors 616 (e.g., GPS signals, PRS signals, etc.). Based on the location of vehicle 200, camera information as well as map information, controller 312 may determine whether vehicle 200 is at an intersection (at 722). If the vehicle is at an intersection, controller 312 may further determine whether vehicle 200 has the right-of-way based on the techniques disclosed above, at 724. If vehicle 200 does not have the right-of-way (at 724), controller 312 may generate an image including a driver showing a gesture (e.g., a hand waving gesture to signal to the other party to move), at 726.

Referring back to 722, if controller 312 determines that vehicle 200 is not at an intersection, controller 312 may determine whether vehicle 200 is at a crosswalk, at 730. If vehicle 200 is at a crosswalk, controller 312 may determine whether a pedestrian is detected waiting at the crosswalk (e.g., based on data from radar sensors and cameras), at 732. If a waiting pedestrian is detected (at 732), controller 312 may proceed to generate an image including a driver showing a gesture at 726.

Referring back to 724, 730, and 732, if controller 312 determines that vehicle 200 has the right-of-way (at 724), not at a crosswalk (at 730), or that no waiting pedestrian is detected (at 732), or after the image including the driver showing a gesture is generated (726), controller 312 may set the light transmittance of at least a portion of a window of vehicle 200 based on ambient light intensity to improve a display quality of the image, at 734. Controller 312 can then provide the image to image output device 304, which enables image output device 304 to output the image on dimmable portion 308 of window 302, at 736.

Some portions of this description describe the embodiments of the disclosure in terms of algorithms and operations. These operations are understood to be implemented by computer programs or equivalent electrical circuits, machine code, or the like. Furthermore, it has also proven convenient, at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. Although the steps, operations, or processes are described in sequence, it will be understood that in some embodiments the sequence order may differ from that which has been described, for example with certain steps, operations, or processes being omitted or performed in parallel or concurrently.

In some embodiments, a software module is implemented with a computer program product comprising a non-transitory computer-readable storage medium containing computer program code, which can be executed by one or more computer processors for performing any or all of the steps, operations, or processes described. Examples of a non-transitory storage medium include, but are not limited to, a magnetic disk or tape, optical storage media such as compact disk (CD) or digital versatile disk (DVD), flash memory, or other memory devices.

The specification and drawings are, accordingly, to be regarded in an illustrative rather than a restrictive sense. It will, however, be evident that additions, subtractions, deletions, and other modifications and changes may be made thereunto without departing from the broader spirit and scope set forth in the claims. Thus, although specific embodiments have been described, these are not intended to be limiting. Various modifications and equivalents are within the scope of the following claims.

What is claimed is:

1. An apparatus of a vehicle, comprising:
    a portion of a window of the vehicle having a configurable light transmittance;

an image output device; and a controller configured to operate in a first mode when the vehicle is partially or fully controlled by a driver inside the vehicle and to operate in a second mode when the vehicle is not controlled by a driver inside the vehicle, wherein, in the first mode, the controller is configured to:
adjust a light transmittance of the portion of the window to a first value to enable the driver inside the vehicle to see through the window;

and wherein, in the second mode, the controller is configured to:
adjust the light transmittance of the portion of the window to a second value lower than the first value, and control the image output device to display an image on the portion of the window while the light transmittance of the portion of the window is at the second value, wherein the image is visible from outside the vehicle.

2. The apparatus of claim 1, wherein content of the image includes an object that resembles a driver.

3. The apparatus of claim 2, further comprising one or more sensors;
wherein the controller is configured to:
determine the content of the image based on data collected from the one or more sensors.

4. The apparatus of claim 3, wherein the controller is further configured to:
determine, based on data from the one or more sensors, whether a pedestrian is on a curbside in front of a crosswalk within a predetermined distance from the vehicle; and
determine the content of the image based on whether the pedestrian is on the curbside in front of the crosswalk.

5. The apparatus of claim 4, wherein the controller is configured to, based on determining that a pedestrian is on the curbside in front of the crosswalk, include a driver making a gesture in the content of the image to indicate to the pedestrian to use the crosswalk.

6. The apparatus of claim 3, wherein the one or more sensors further comprise a light intensity sensor configured to detect an ambient light intensity; and
wherein the controller is configured to decrease the light transmittance of the portion of the window based on the ambient light intensity exceeding a threshold.

7. The apparatus of claim 1, further comprising an audio output device and an audio input device,
wherein the controller is configured to control the image output device, the audio output device and the audio input device to provide a two-way communication session between a remote person associated with the vehicle and a person outside of the vehicle.

8. The apparatus of claim 1, wherein the portion of the window of the vehicle also has a configurable light reflectivity controllable by the controller;
wherein the controller is configured to, in a third mode of operation:
control the image output device to display the image based on an input from an occupant of the vehicle;
set the light reflectivity of the portion of the window to reflect light of the displayed image towards the occupant inside the vehicle; and
set the light transmittance of the portion of the window to substantially block the light of the image.

9. The apparatus of claim 1, wherein the image is displayed on the portion of the window by an image projection device.

10. A method of operating a vehicle, comprising:
in a first mode when the vehicle is partially or fully controlled by a driver inside the vehicle, adjusting a light transmittance of a portion of a window of the vehicle to a first value to enable the driver inside the vehicle to see through the window;
and in a second mode when the vehicle is not controlled by a driver inside the vehicle:
adjusting the light transmittance of the portion of the window to a second value lower than the first value, and
controlling an image display device to display an image on the portion of the window while the transmittance of the portion of the window is at the second value such that the image becomes visible from outside the vehicle.

11. The method of claim 10, wherein content of the image includes an object that resembles a driver.

12. The method of claim 11, further comprising:
collecting data from one or more sensors; and
determining the content of the image based on the data collected from the one or more sensors.

13. The method of claim 12, further comprising:
determining, based on the data from the one or more sensors, whether a pedestrian is on a curbside in front of a crosswalk within a predetermined distance from the vehicle; and
determining the content of the image based on whether the pedestrian is on the curbside in front of the crosswalk.

14. The method of claim 13, further comprising: based on determining that a pedestrian is on the curbside in front of the crosswalk, including a driver making a gesture in the content of the image to indicate to the pedestrian to use the crosswalk.

15. The method of claim 12, wherein the data collected from the one or more sensors include a measurement of an ambient light intensity; and
wherein the method further comprises decreasing the light transmittance of the portion of the window based on the ambient light intensity exceeding a threshold.

16. The method of claim 10, further comprising, in a third mode of operation:
displaying the image based on an input from an occupant of the vehicle;
setting a light reflectivity of the portion of the window to reflect light of the displayed image towards the occupant inside the vehicle; and
setting the light transmittance of the portion of the window to substantially block the light of the image.

17. A non-transitory computer readable medium storing instructions that, when executed by a processor of a vehicle, cause the processor to perform:
in a first mode when the vehicle is partially or fully controlled by a driver inside the vehicle, adjusting a light transmittance of a portion of a window of the vehicle to a first value to enable the driver inside the vehicle to see through the window;
and in a second mode when the vehicle is not controlled by a driver inside the vehicle:
adjusting the light transmittance of the portion of the window to a second value lower than the first value, and
controlling an image output device to display an image on the portion of the window while the transmittance of the portion of the window is at the second value such that the image becomes visible from outside the vehicle.

18. The non-transitory computer readable medium of claim 17, wherein content of the image includes an object that resembles a driver.

19. The non-transitory computer readable medium of claim 18, wherein the instructions, when executed by the processor of the vehicle, cause the processor to perform:
   determining, based on data from one or more sensors, whether a pedestrian is on a curbside in front of a crosswalk within a predetermined distance from the vehicle; and
   determining the content of the image based on whether the pedestrian is on the curbside in front of the crosswalk.

20. The non-transitory computer readable medium of claim 17, wherein the instructions, when executed by the processor of the vehicle, cause the processor to perform, in a third mode of operation:
   controlling the portion of the window to display the image based on an input from an occupant of the vehicle;
   setting a light reflectivity of the portion of the window to reflect light of the displayed image towards the occupant inside the vehicle; and
   setting the light transmittance of the portion of the window to substantially block the light of the image.

* * * * *